Patented Sept. 29, 1942

2,297,388

UNITED STATES PATENT OFFICE 2,297,388

DISINFECTANT AND PROCESS OF ITS MANUFACTURE

Helmut Böhler, Radebeul, near Dresden, Germany; vested in the Alien Property Custodian No Drawing. Application April 2, 1940, Serial No. 327,475. In Germany April 4, 1939

8 Claims. (Cl. 167—30)

My invention relates to new disinfectants from hydroxybiphenyls. It concerns especially the manufacture of stable emulsions of hydroxybiphenyls.

It is known, that phenols may be dissolved in the usual esmulsifying agents and that such solutions, when diluted with water, give emulsions of the phenol applied. If the phenols used are hydroxybiphenyls, by which are to be understood not only the o- and p-hydroxybiphenyl but also the corresponding substitution products, containing substituents like alkyls, halogen or other elements or groups in the benzene nucleus, no sufficiently stable emulsions in water are obtained when using the usual emulsifying agents.

Now I have found, that such emulsions are obtained in an especially stable form, if aromatic ethers are added to the hydroxybiphenyls. By aromatic ethers I understand ether-like compounds containing at least one aromatic radical, e. g. anisol, guaiacol, veratrol, diphenyloxide, dicresyloxide, pheny benzyl oxide and other benzylic ethers, etc. The ethers mentioned may also be substituted by other groups or atoms.

I have further found it to be of special advantage when producing emulsions, not to start from the pure hydroxy-biphenyls, but to use the hydroxybiphenyls in form of mixtures as they occur technically as by-products when saponifying under pressure chlorinated aromatic hydrocarbons e. g. chlorbenzene. Such mixtures contain the hydroxybiphenyls mixed with phenylic ethers. If a technical mixture like that is treated with the emulsifying agents known in the literature, products giving extraordinarily stable emulsions with water are obtained.

Of the emulsifying agents known, the following may be mentioned as examples: salts of fatty acids, aliphatic sulphonic acids like Turkey red oil, aromatic sulphonic acids like alkyl-naphthalene-sulfonic acids, benzene- or toluene-sulphonic acids and like salts of sulphonated oils, salts of naphthenic acid, salts of products of the oxidation of paraffins, sulphite waste lye, saponines, lecithine products and others, my invention not being restricted to these examples.

The manufacture of the mixtures and emulsions according to the present invention may be illustrated by the following examples.

*Example 1*

A mixture is made of 4 parts of hydroxybiphenyl and 2.5 parts of phenylic ether, and 3.4 parts of Turkey red oil are added. If such a solution is diluted with water or poured into water while agitated, a completely stable emulsion is obtained, from which the hydroxybiphenyl does not separate in crystals.

*Example 2*

A mixture obtained as by-product in the saponification of chlorbenzene under pressure, containing about 4 parts of p-hydroxybiphenyl, 6 parts of o-hydroxybiphenyl and 3.5 parts of phenylic ether, is dissolved in 3 parts of Turkey red oil. This solution when diluted with water gives a stable emulsion.

*Example 3*

11 parts of o-hydroxybiphenyl, 8 parts of Turkey red oil and 4 parts of guaiacol give a solution, which when being diluted with water gives a stable emulsion.

Also, when other known emulsifying agents are used, mixtures giving very stable emulsions upon dilution with water are obtained in the same manner as with Turkey red oil.

The emulsions made according to my invention are excellently adapted for disinfecting purposes, since they fully develop the disinfecting power of the hydroxybiphenyls. As I have found, other phenols may also be added to the hydroxybiphenyls. Other disinfectants may also be added to the mixtures obtained according to my invention.

What I claim is:

1. Disinfectant, aqueous emulsions of emulsifying agents and hydroxybiphenyls stabilized by aromatic ethers.

2. Disinfectant, aqueous emulsions of emulsifying agents and hydroxybiphenyls stabilized by phenylic ethers.

3. Disinfectant, aqueous emulsions of Turkey red oil and hydroxybiphenyls stabilized by phenylic ethers.

4. Disinfectant, aqueous emulsions of emulsifying agents and hydroxybiphenyls stabilized by mixtures of phenylic ethers as they are formed in the process of making phenol by saponification of chlorbenzene.

5. Disinfectant, stable aqueous emulsions of emulsifying agents and mixtures of hydroxybiphenyls and aromatic ethers as they are formed in the process of making phenol by saponification of chlorbenzene.

6. In the method of making disinfectant aqueous emulsions of emulisfying agents and hydroxybiphenyls, the step of stabilizing said emulsions by addition of aromatic ethers.

7. In the method of making disinfectant aqueous emulsions of emulsifying agents and hydroxybiphenyls, the step of stabilizing said emulsions by addition of phenylic ethers.

8. In a method of making stable aqueous emulsions of hydroxybiphenyls, the step of emulsifying in water, in the presence of emulsifying agents, mixtures of hydroxybiphenyls and aromatic ethers formed in the process of making phenol by saponification of chlorbenzene.

HELMUT BÖHLER.